United States Patent Office 3,625,741
Patented Dec. 7, 1971

---

3,625,741
METHOD OF BONDING POLYMERS OF GLYCOL ACRYLATES AND METHACRYLATES TO HYDROPHOBIC SURFACES
Vladimir Stoy, Karel Kliment, Miroslav Stol, and Jiri Vodnansky, Prague, Czechoslovakia, assignors to Ceskoslovenska Akademie Ved, Prague, Czechoslovakia
No Drawing. Filed May 8, 1968, Ser. No. 727,674
Claims priority, application Czechoslovakia, May 12, 1967, 3,440/67
Int. Cl. B44d 1/14; B32b 15/08
U.S. Cl. 117—75
8 Claims

ABSTRACT OF THE DISCLOSURE

Layers of hydrophilic polymers of glycol acrylates and methacrylates, which swell and shrink under varying ambient humidity, are firmly bonded to dimensionally stable substrates by an interposed primer film of mixtures or copolymers of the same materials with hydrophobic constituents, the latter being present in a sufficient amount to reduce the moisture-induced swelling and shrinking of the primer to less than that of the hydrophilic polymer.

---

This invention relates to the bonding of polymers and copolymers of glycol methacrylate and acrylate to various substrates.

The polymeric materials to be bonded by the method of the invention will be discussed hereinafter with specific reference to ethyleneglycol methacrylate which is of greatest practical significance at this time, but it will be understood that the corresponding esters of diethylene glycol, triethyleneglycol, and higher members of the same series, having as many as six ($C_2H_4O$) groups may at least partly replace the ethyleneglycol radical, and acrylates may be substituted for the methacrylates without basically changing the procedures used nor the results achieved.

Bodies of ethyleneglycol monomethacrylate polymerized in the presence of a small amount of ethyleneglycol dimethacrylate as a cross-linking agent are water-insoluble, yet strongly hydrophilic. They swell by absorption of water in which they are immersed, and thereafter shrink by loss of water to ambient dry air. Yet, they remain fully transparent in thin layers.

Coatings of polymerized and partly cross-linked ethyleneglycol methacrylate, when applied to windows, thus prevent fogging by droplets of condensed moisture, and are used to advantage in laboratory equipment such as burettes to prevent individual drops from clinging to container surfaces. Other applications will readily come to mind.

The coatings adhere to many substrates on which they are formed by polymerization from a liquid mixture, but the bond deteriorates when exposed to high humidity if the substrate is dimensionally stable under such conditions while the polymeric coating swells. The hydrophilic materials is readily bonded to practically any surface by suitably chosen, commercially available cements, but the cemented bonds are equally susceptible to failure under conditions of varying ambient moisture.

The object of the invention is the provision of a method for firmly and permently bondng hydrophilic polymers of the type described to the surface of a substrate whose dimensions are not significantly affected by conditions of varying ambient moisture.

The polymeric hydrophilic materials with which this invention is concerned have repeting units of the formula

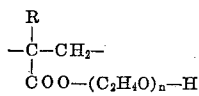

wherein R is hydrogen or methyl, and $n$ is an integer, not usually greater than 6. We have found that a layer of such material can be bonded to a dimensionally more stable substrate by interposing a film of a primer material between the layer and the substrate surface, the film essentially consisting of a homogenous mixture of the aforedescribed polymeric material with a less hydrophilic material in an amount sufficient to reduce the swelling and shrinking of the film under conditions of varying ambient moisture to less than the swelling and shrinking of the superposed layer under the same conditions. The primer film is bonded to the substrate surface and to the top layer of strongly hydrophilic material.

Other features, additional objects and many of the attendant advantages of this invention will readily become apparent from the following description of preferred embodiments which, however, are not intended to limit the invention.

EXAMPLE 1

A copolymer of 80% ethyleneglycol monomethacrylate and 20% ethyl methacrylate was dissolved in a mixture of equal volumes of acetone and ethanol. The solution was poured over a horizontal glass plate, and the solvent was permitted to evaporate. The primer film so produced was further covered with a polymerization mixture consisting of:

| | Parts (wt.) |
|---|---|
| Ethyleneglycol monomethacrylate | 65 |
| Glycerol | 35 |
| Di-i-propyl percarbonate | 0.3 |

The ethylene glycol monomethacrylate contained 0.36% ethyleneglycol dimethyacrylate as an impurity which acted as a cross-linking agent, and the same material was used in the examples which follow.

When the top layer had polymerized, it adhered firmly to the primer coating, and could be peeled with the same from the glass plate. The laminar film so obtained was applied to a base sheet of polymethyl methacrylate whose surface had been freshly coated with methyl methacrylate monomer binder containing a catalyst.

When the binder was cured, there was obtained a laminar sheet of transparent window material, one face of which was formed by the hydrophilic polymer of ethyleneglycol methacrylate, sufficiently cross-linked by the corresponding diester to make it insoluble in water, yet capable of swelling and shrinking as ambient moisture changed.

The coated surface did not fog when entering humid air while at a temperature below the dew point of the air. The bond formed between the hydrophobic plastic substrate and the hydrophilic top layer by the interposed primer film successfully withstood expansion and contraction of the top layer under varying ambient humidity which did not significantly affect the dimensions of the base sheet, as by immersion in water followed by air drying.

EXAMPLE 2

A rod of polymethylmethacrylate was immersed for one hour in a mixture of equal volumes of chloroform, ethyleneglycol monomethacrylate, and methyl methacrylate. The liquid diffused into the surface of the rod by partly dissolving and swelling the base material.

The rod was then transferred to a mold in which it was immersed in a layer of a homogeneous mixture of 70% ethyleneglycol monomethyacrylate and 30% glycerol containing 0.05% diisopropyl percarbonate as an initiator. The outer layer, which readily polymerized at the ambient temperature of about 20° C., was firmly bonded to all longitudinal surfaces of the rod. The rod did not fog under conditions of varying temperature and humidity in the ambient air, as described in Example 1, and the adhesion of the surface layer to the base was not unfavorably affected by alternating immersion in water and air drying.

EXAMPLE 3

A block copolymer of 80% ethyleneglycol methacrylate and 20% epoxy resin (without hardener) was dissolved in dimethylformamide to make a 10% solution which was poured over a horizontal glass plate. The primer film formed after evaporation of the solvent was coated with the polymerization mixture described in Example 1, and the laminar sheet obtained after curing of the top layer was released from the glass base when swelled by immersion in water. It was dried by infrared radiation directed against the primer layer, and was then bonded by means of epoxy cement to a copper sheet whose surface had been roughened somewhat by abrasive cleaning, and had been degreased by means of organic solvents.

The wet strength of the bond between the laminar film and the copper surface substantially exceeded the mechanical strength of the swollen copolymer.

EXAMPLE 4

A nickel tube, roughened and degreased as described in the preceding example, was coated with a 50% dimethylformamide solution of a block copolymer of ethyleneglycol monomethacrylate with 10% epoxy resin (without hardener).

After evaporation of the solvent, the primed tube was dipped in a viscous prepolymer obtained by partial copolymerization of ethyleneglycol monomethacrylate with 0.2% ethyleneglycol bismethacrylate in the presence of 0.02% diisopropyl percarbonate 20° C. After withdrawal of the tube from the prepolymer, the top coating was fully cured under the light of an ultraviolet lamp while the tube was slowly turned about its axis.

Adhesion of the hydrophilic top layer to the nickel base was excellent under conditions of varying ambient moisture which caused the top layer to expand and to contract.

EXAMPLE 5

A polystyrene block was immersed for one hour in a 20% solution of ethyleneglycol monomethacrylate in benzene and was thereafter dried in a stream of hot air for 10 minutes to evaporate the solvent. The resulting primer surface of polystyrene containing diffused ethyleneglycol monomethacrylate was coated with a top layer of sparingly cross-linked, polymerized ethyleneglycol monomethacrylate in the manner described in Example 2.

When the coated block was chilled and immersed in moist air whose dew point was below the temperature of the block, it remained transparent. Adhesion of the surface layer to the substrate was not impaired by cyclic immersion in water and airdrying.

EXAMPLE 6

A thin rubber tubing destined for surgical purposes as a stomach or intestinal tract sound or urethra sound, was covered with a smooth, slippery hydrogel layer loaded with antibiotics and anaesthetics or other drugs, using following method:

An Indian rubber tube, length 40 cm., external diameter 8 mm., inner diameter 4 mm., was swelled in a mixture of xylene and ethylene glycol methacrylate (1:1). Xylene was then extracted by hexane flowing slowly through the tube. Glycol methacrylate, which is not soluble in hexane, remained in the rubber, which, however, was not significantly swelled thereby. After finishing extraction the tube was slipped onto a metal wire, whereby the inner surface of the tube became inaccessible. The tube was then immersed in a mixture of 60 weight parts methanol, 20 weight parts of ethylene glycol monomethacrylate (containing 0.7% of glycol dimethacrylate), and 20 weight parts of soluble, non-crosslinked ethylene glycol methacrylate polymer, and 0.4 weight parts of dibenzoylperoxide. After evaporating methanol an elastic, non-sticky coating remained, consisting of equal parts of glycol methacrylate and its soluble polymer. The tube was then heated in a vacuum drier at 60° C., increasing the vacuum gradually for 100 torr in each 10 minutes. After 60–90 minutes curing the 0.5 mm. thick layer of hydrophilic polymer was obtained. The coating was smooth and adhered firmly to the rubber even in hot water or ethanol. The surface was slippery and caused much less inconvenience than usual rubber sound without hydrophilic coating. Moreover, the coating could be loaded with antibiotics, antiseptics and anesthetics which cannot penetrate into rubber. The coated tube could be sterilized by boiling in water without any damage.

EXAMPLE 7

Similar rubber tube like in Example 6 was first swelled in a mixture of 50 weight parts of benzene, 45 parts of ethylene glycol monoacrylate, 4 parts of ethylene glycol diacrylate and 1 part of dibenzoylperoxide. The swelling lasted 5–8 minutes at room temperature. Benzene was then evaporated by drying at 50° C., and the tube was coated with a mixture of 40 weight parts of methanol, 20 parts of benzene, 20 parts of a soluble polymer of ethylene glycol acrylate, 20 parts of ethylene glycol monoacrylate, containing 1% of glycol diacrylate, and 1% di-isopropyl percarbonate. The coated tube was left one day at ambient temperature and then heated 2 hours to 70° C. in carbon dioxide. The tube, having an 0.6 mm. thick outer hydrogel layer, was then thoroughly washed in cold and hot water. It has similar properties like the product obtained according to Example 6.

EXAMPLE 8

The process according to Example 7 was repeated except that the rubber tube was swelled in glycidyl methacrylate of the formula

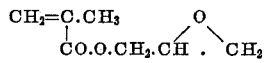

for 10–15 minutes, and the pH of the subsequent coating was decreased to 4–4.5 by adding 50% aqueous sulfuric acid. The polymerization was carried out in the same way as in Example 2. The hydrogel coating thus obtained adhered firmly to the rubber.

EXAMPLE 9

A 4 mm. thick rubber sheet was swelled in a 50% solution of ethylene glycol monomethacrylate in benzene. After evaporating benzene the sheet was cooled down to −72° C. in a mixture of hexane with solid carbon dioxide. At the same temperature the rubber sheet was then irradiated by UV-rays for 10 minutes under nitrogen. The sheet was then immersed into ethylene glycol monomethacrylate and left therein until reaching ambient temperature, i.e. for about an hour. Thereafter the sheet was coated with initiated glycol methacrylate-glycol methacrylate polymer mixture in the manner described in Example 6. The outer hydrogel layer thus obtained adhered firmly on the rubber.

While the above examples are limited to laminar structures having three layers whose ability of swelling and shrinking under conditions of varying ambient humidity sequentially decreases, the invention obviously is not limited to single primer films interposed between a substrate and a surface layer. If two or more primer films are superimposed on each other, the percentage of ethyleneglycol monomethacrylate should decrease in steps from the surface layer to the substrate. In this manner, strong covalent bonds are set up between all layers of the laminar structure with the possible exception of the interface between the substrate and the innermost primar film. The bond is further strengthened when either the primer film or the layer of most hydrophilic material is formed by polymerization while in contact with the other so that monomer from the initially liquid polymerization mixture can penetrate the previously formed solid body.

The homogeneous mixture of polymerized ethyleneglycol methacrylate with less hydrophilic material in the primer film can be brought about by copolymerization as described in Example 1, or by mixing a polymer with a monomer as described in Example 2, and subjecting the mixture to polymerization conditions. Other methods will readily suggest themselves to those skilled in the art. Solvents may be used as needed to facilitate mixing.

The primar film may be bonded to the substrate as well as to the outer layer of more hydrophilic polymeric material by polymerization of a monomer soluble or present in the film and soluble in the substrate or in the surface layer. The strongest bonds are obtained in this manner and are formed in all the examples given above. Bonds prepared by means of cements, however, are also within the scope of this invention, and permit the application of primer films of the invention to metallic and other substrates. Commercially available adhesives based on epoxy resins and hardening agents are generally usable. Adequate bonding, however, may also be achieved by mechanical interlocking of the primer film with a suitably roughened substrate.

The amount of ethyleneglycol dimethacrylate present in the monoester is not overly critical. The polymers, however, do not combine adequate insolubility with good hydrophilic properties if the diester is present in an amount substantially smaller than 0.05% or substantially greater than 2%. The acrylates are closely similar to the corresponding methacrylates in their function in this invention except for greater sensitivity to hydrolyzing agents.

Practically the same results are obtained when the esters of ethyleneglycol and the corresponding polymers are replaced by the analogous esters of diethyleneglycol, triethyleneglycol or higher polyethyleneglycols so that the polymers contain repeating units of up to six ($C_2H_4O$) groups.

When the primar film consists of a coplymer of ethyleneglycol methacrylate or the afore-mentioned analogs or homologs thereof with lower alkyl esters or benzyl esters of acrylic and methacrylic acid, the primer has particularly good optical and mechanical properties. The ethyl methacrylate referred to in Example 1 may thus be replaced by the corresponding methyl or benzyl esters, and the methyl methacrylate in Example 2 by ethyl or benzyl acrylate.

The bonding primer film can be also formed by a copolymer of a glycol acrylate or methacrylate with a monomer capable of forming a hydrophobic polymer, which copolymer is obtained in situ by cementing the two materials, i.e. the hydrogel and the hydrophobic polymer, with an initiated mixture of the two monomers. Prior to polymerization the monomers penetrate into the materials to be bonded, monomeric glycol methacrylate or acrylate diffusing more easily into the hydrogel layer and the other monomer, e.g. methyl methacrylate, into the hydrophobic substrate, e.g. polymethylmethacrylate/or polystyrene. In this way, after the polymerization finished, the two materials are bonded by a copolymer, partly penetrating them, said copolymer having gradually changing composition and hydrophilic properties in the desired manner.

The gradual change from hydrophobic nature of the substrate to the hydrophilic nature of the outer hydrogel layer reduces local tangential stress caused by swelling and shrinking of the hydrogel under conditions of varying ambient moisture. The tangential stress is no more confined to the very thin contact surface between the two bonded materials and concentrated therein, but it is distributed gradually into a number of diffusing thin layers. Thus, it cannot endanger the strength of the bond.

According to another embodiment, the copolymer film is built by an inserted copolymer foil. The foil is cemented with the hydrophobic surface, e.g. polymethylmethacrylate, by moistening with an initiated monomer, forming equal or similar hydrophobic polymer upon polymerization, e.g. with methyl or ethyl methacrylate. This monomer diffuses both in the substrate and the copolymer foil obtained by copolymerizing a glycol methacrylate or acrylate with said other monomer (methyl—or ethyl methacrylate, styrene or similar). Thereafter, a glycol acrylate or—methacrylate monomeric mixture, initiated with a peroxidic or axo-polymerization catalyst, is applied onto the foil. Prior the polymerization, a part of the glycol methacrylate or acrylate monomer diffuses into the copolymer foil and copolymerizes therein with the other monomer, penetrating from the other side.

If glycol methacrylate or acrylate monomer diffuses too slowly into the hydrophobic substrate like in the case of rubber, the diffusion can be aided by transient swelling the substrate with a liquid well miscible with the monomer, e.g. with a lower aromatic hydrocarbon, as shown in foregoing examples. If desired the initiated monomer mixture may be thickned by a soluble non-crosslinked polymer having repeating units of the given formula.

What we claim is:

1. A method of bonding a layer of water-insoluble, but hydrophilic polymeric material capable of swelling and shrinking under conditions of varying ambient moisture, to a substrate material whose dimensions are not significantly affected by said conditions, said polymeric material essentially consisting of glycol acrylates or methacrylates having repeating units of the formula

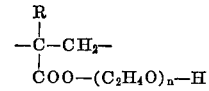

wherein R is hydrogen or methyl and $n$ is an integer not greater than six, which method comprises applying a film of a primer to said substrate, said film consisting essentially of a homogenous mixture of said polymeric material with a material less hydrophilic than said polymeric material in an amount sufficient to reduce the swelling and shrinking of said film under said conditions to less than the swelling and shrinking of said layer, and applying said polymeric layer to the primer film to form a coherent bond between the substrate, primer film and hydrophilic polymeric layer.

2. A method as set forth in claim 1 wherein said film essentially consists of a copolymer of an olefinic monomer, corresponding to said repeating unit, with a monomer selected from the group consisting of lower alkyl, benzyl ester of acrylic acid and methacrylic acid.

3. A method as set forth in claim 1, wherein said film essentially consists of a copolymer of an olefinic monomer, corresponding to said repeating unit, with a monomer selected from the group consisting of lower alkyl, benzyl ester of acrylic acid and methacrylic acid, said copolymer being formed by copolymerizing an initiated mixture of said monomers between said surface and said layer.

4. A method as set forth in claim 1, wherein said film consists essentially of a copolymer of a non-hardened epoxy resin with a monomer corresponding to said repeating unit.

5. A method as set forth in claim 1, wherein said substrate material is metallic, and said film is bonded to said surface by an epoxy cement.

6. A method as set forth in claim 1, wherein said film is formed by polymerizing a monomer selected from the group consisting of glycidyl methacrylate and glycidyl acrylate on said substrate and wherein said layer is formed by applying an initiated monomeric mixture, consisting essentially of a glycol monoacrylate or monomethacrylate, containing 0.1–2.0% of the corresponding diester, and copolymerizing said initiated mixture thereon.

7. A method of bonding a layer of a water-insoluble, but hydrophilic polymeric material capable of swelling and shrinking under conditions of varying ambient moisture, to a substrate material selected from the group consisting of poly-lower alkyl methacrylate whose dimensions are not significantly affected by said conditions, said polymeric material essentially consisting of glycol acrylates or methacrylates having repeating units of the formula

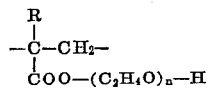

wherein R is hydrogen or methyl and *n* is an integer not greater than six, which method comprises interposing a polymerized foil between said substrate and said layer, said foil consisting essentially of a homogenous mixture of said polymeric material with a material less hydrophilic than said polymeric material in an amount sufficient to reduce the swelling and shrinking of said foil under said conditions to less than the swelling and shrinking of said layer, applying a monomer of a lower-alkyl methacrylate or styrene between said foil and said substrate and an initiated monomeric mixture consisting essentially of a monomer corresponding to said repeating unit with 0.1-2.0% of the corresponding diester, and polymerizing said applied monomer and mixture respectively to adhere said foil to both said layer and said substrate.

8. A method as set forth in claim 7, wherein said initiated monomeric mixture is thickened by a soluble, non-crosslinked polymer having said repeating units.

References Cited
UNITED STATES PATENTS

| | | | |
|---|---|---|---|
| 3,012,287 | 12/1961 | Tucker | 264—20 |
| 3,272,647 | 9/1966 | Swanson et al. | 117—75 |
| 3,317,450 | 5/1967 | Grenley et al. | 117—72 |
| 3,470,615 | 10/1969 | Petner | 117—75 X |

WILLIAM D. MARTIN, Primary Examiner

R. HUSACK, Assistant Examiner

U.S. Cl. X.R.

117—72, 93.31, 124 E, 138.8 UA, 139; 128—349; 156—330, 332; 161—216, 252